United States Patent [19]

Gioutsos et al.

[11] Patent Number: 5,478,108
[45] Date of Patent: Dec. 26, 1995

[54] SYSTEM AND METHOD FOR REDUCING EFFECT OF NEGATIVE DATA IN CRASH DISCRIMINATION

[75] Inventors: Tony Gioutsos, Brighton; Daniel N. Tabar, Troy, both of Mich.

[73] Assignee: Automotive Systems Laboratory, Inc., Farmington Hills, Mich.

[21] Appl. No.: 298,843

[22] Filed: Aug. 31, 1994

[51] Int. Cl.⁶ ................................................. B60R 21/32
[52] U.S. Cl. .......................... 280/735; 180/282; 340/436; 364/424.05
[58] Field of Search ..................... 280/735, 734, 280/728.1; 180/282; 340/436, 438, 669; 364/424.05; 307/10.1

[56] References Cited

U.S. PATENT DOCUMENTS

| | | | |
|---|---|---|---|
| 4,975,850 | 12/1990 | Diller | 280/735 |
| 5,065,322 | 11/1991 | Mazur et al. | 280/735 |
| 5,253,173 | 10/1993 | Drobny et al. | 280/735 |
| 5,317,512 | 5/1994 | Ota et al. | 280/735 |
| 5,339,242 | 8/1994 | Reid et al. | 280/735 |
| 5,363,302 | 11/1994 | Allen et al. | 280/735 |

FOREIGN PATENT DOCUMENTS

| | | | |
|---|---|---|---|
| 0536996 | 4/1993 | European Pat. Off. | 280/735 |
| 0536997 | 4/1993 | European Pat. Off. | 280/735 |

*Primary Examiner*—Margaret A. Focarino
*Assistant Examiner*—Peter C. English
*Attorney, Agent, or Firm*—Lyman R. Lyon

[57] ABSTRACT

A system and method for controlling actuation of a vehicle passenger safety device in response to an event possibly requiring actuation of the safety device, wherein a modified differentiated measure is generated from received vehicle acceleration information by subtracting the absolute value of a prior-in-time value therefor from its current value, whereby the distortion introduced by negative prior-in-time values is significantly reduced. The resulting modified jerk measure is more useful in discriminating crash events than is a nominal jerk measure, given the latter's predisposition to fail as a useful measure upon encountering negative prior-in-time values.

12 Claims, 1 Drawing Sheet

5,478,108

SYSTEM AND METHOD FOR REDUCING EFFECT OF NEGATIVE DATA IN CRASH DISCRIMINATION

BACKGROUND OF THE INVENTION

The instant invention relates to systems and methods for controlling the actuation of vehicle safety devices and, more particularly, to systems and methods which utilize one or more evaluative measures with which to analyze events possibly requiring actuation of the safety device, wherein each measure is a function of received physical information such as transitory vehicle acceleration information and/or the transitory position of a passenger relative to a fixed structure within the vehicle, and wherein at least one of the measures is calculated by differentiating the received physical information or a function thereof with respect to time.

A variety of systems and methods for actuating vehicle safety devices are well known in the art. Such systems are used to sense an event such as a crash condition and, in response to such an event, to actuate an air bag, or lock a seat belt, or actuate a pretensioner for a seat belt retractor. Typically, the safety device is actuated into its protective position when an impact exceeding a predetermined magnitude is detected by the actuating system.

Significantly, known systems and methods for controlling actuation of vehicle safety devices typically rely on changes in one or more estimated physical quantities or crash-discrimination "measures" in determining whether to actuate the safety device. Oftentimes, one or more of these evaluative measures (or an intermediate measure useful in the determination of these measures) is obtained by differentiating received physical information, such as transitory vehicle acceleration information and/or the transitory position of a passenger relative to a fixed structure within the vehicle, with respect to time. One such known measure, a jerk value or "slope of acceleration" value, is obtained by differentiating received vehicle acceleration information over time. Another known measure, variance-itself a statistical measure of variation among a given number of sampled values—is obtained as by storing and rank-ordering received acceleration information so as to obtain a highest-ranked acceleration value within the stored sample and a lowest-ranked acceleration value within the sample, with the temporal variance value being the absolute value of the difference between the highest-ranked value and the lowest-ranked value.

Unfortunately, however, the use of differentiated information as when calculating jerk or variance values becomes problematic when transitory values for the information become negative, since a small positive value minus a large negative number generates an even larger positive value, which in turn tends to greatly distort any analysis based on that differentiated information. Indeed, where a waveform resonates about a small mean value, or even in the case of rough road inputs, an accumulated measure based on positive jerk or positive variance will quickly become meaningless, since its value will quickly surpass its triggering threshold to actuate the safety device irrespective of the true character of the event (whether a crash or an event not otherwise requiring actuation of the safety device).

SUMMARY OF THE INVENTION

It is an object of the instant invention to provide an improved system and method for controlling actuation of a vehicle passenger safety device featuring an evaluative measure based upon differentiated received information which is less likely to erroneously indicate a false "ON" condition when encountering negative values for the underlying information.

Another object of the instant invention is to provide an improved system and method for controlling actuation of a vehicle passenger safety device featuring a slope-of-acceleration measure whose utility in crash discrimination is not otherwise diminished when based in part on negative acceleration values.

Another object of the instant invention is to provide an improved system and method for controlling actuation of a vehicle passenger safety device featuring a variance-of-acceleration measure whose utility in crash discrimination is not otherwise diminished when based in part on negative acceleration values.

Under the invention, in a system and method for controlling actuation of a vehicle passenger safety device in response to an event possibly requiring actuation of the device, wherein received physical information, such as received vehicle acceleration information or transitory passenger position information, or an intermediate value generated therefrom, is itself differentiated with respect to time to obtain a measure useful in determining event severity as through subsequent comparison with a threshold value, the improvement wherein the first value normally subtracted from the second value to obtain the desired measure is itself replaced by the absolute value of the first value.

The invention may be utilized where ever received physical information or a function thereof is differentiated with respect to time. Thus, in a first preferred embodiment, the modified differentiated measure is a modified value for temporal jerk, wherein the first value is a prior-in-time value for received information and the second value is typically a current value for received information; and, in a second preferred embodiment, the modified differentiated measure is a modified value for temporal variance, where the first value and second values are the lowest-ranked and highest-ranked values, respectively, from a transitory, N-value sample of received information.

DETAILED DESCRIPTION OF THE PREFERRED EMBODIMENT(S)

Figure 1:
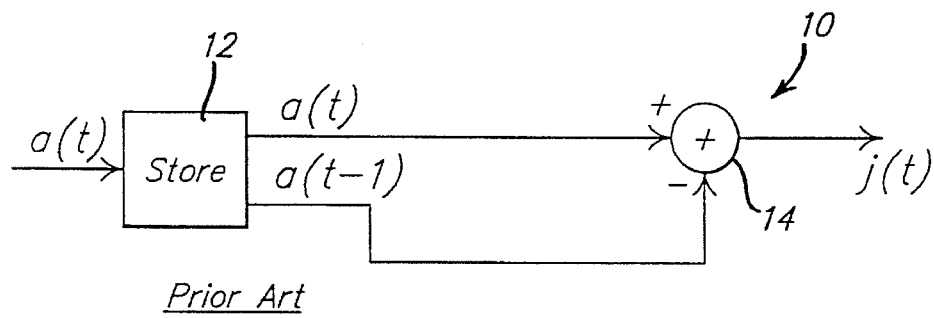
FIG. 1 is a diagrammatic schematic of a prior art implementing circuit for use in a system for controlling actuation of a vehicle passenger safety device, wherein a jerk value is generated from received vehicle acceleration information.

Referring to the drawings, FIG. 1 is a diagrammatic schematic of a typical prior art implementing circuit 10 for generating a jerk value from received vehicle acceleration information a(t) generated as by an acceleration sensor (not shown), as might be found in a system for controlling actuation of a vehicle passenger safety device, such as an air bag (not shown). Specifically, the prior art circuit 10 for generating a jerk value j(t) at a current time t includes a storage means 12, such as a RAM, for storing the current value a(t) for the received vehicle acceleration information and at least one prior-in-time value a(t−1) therefor as received at a prior time t−1; and a summing junction 14 for subtracting the stored prior-in-time value a(t−1) for received vehicle acceleration information from the current value a(t) therefor to obtain the desired temporal jerk value j(t).

Figure 2:
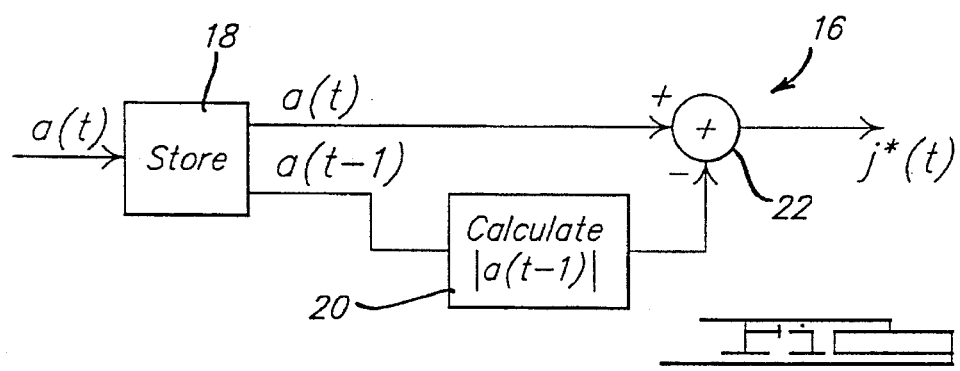
FIG. 2 is a diagrammatic schematic of a first exemplary implementing circuit for use in a system for controlling actuation of a vehicle passenger safety device, wherein a modified jerk value is generated from received vehicle acceleration information in accordance with the invention.

FIG. 2 shows a first exemplary implementing circuit 16 in accordance with the present invention for generating a modified jerk value j*(t) from received vehicle acceleration information a(t), as might be found in a system for use in a system for controlling actuation of a vehicle passenger safety device. Specifically, the first exemplary circuit 16 includes a storage means 18, such as a RAM, responsive to the received vehicle acceleration information for storing the current value a(t) and at least one prior-in-time value a(t−1) therefor as received at a prior time t−1; a calculating means 20 responsive to the stored prior-in-time value a(t−1) for generating its absolute value |a(t−1)|; and a summing junction 22 for subtracting the thus-generated absolute value |a(t−1)| of the prior stored value a(t−1) from the current value a(t) therefor to obtain the desired modified jerk value j*(t).

As noted above, by generating the absolute value of the stored prior-in-time acceleration value a(t−1) for use in the summing junction 22, the effects of negative acceleration values on the resulting modified jerk measure j*(t) are significantly reduced. In this manner, these negative transitory values will no longer serve to greatly distort the modified jerk measure j*(t) as they would the nominal jerk measure j(t) generated by the prior art implementing circuit 10 shown in FIG. 1. Still further, under the invention, the first exemplary implementing circuit 16 of FIG. 2 will generate the same value as the prior art circuit 10 shown in FIG. 1 whenever the prior-in-time acceleration value a(t−1) is positive.

In this regard, it must be remembered that the modified jerk measure j*(t) generated in accordance with the invention is itself a measure useful in detecting an event requiring actuation of the safety device and, hence, should not be viewed merely as an attempt at providing an accurate value for transitory jerk.

Figure 3:
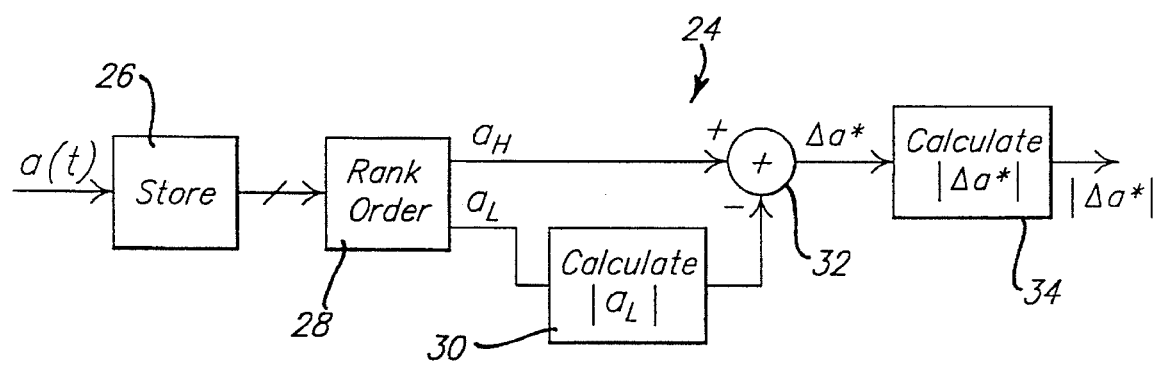
FIG. 3 is a diagrammatic schematic of a second exemplary implementing circuit for use in a system for controlling actuation of a vehicle passenger safety device, wherein a modified variance value is generated from received vehicle acceleration information in accordance with the invention.

FIG. 3 shows a second exemplary implementing circuit 24 in accordance with the present invention for generating a modified variance value |Δa*(t)| from received vehicle acceleration information a(t), as might be found in a system for use in a system for controlling actuation of a vehicle passenger safety device. Specifically, the second exemplary circuit 24 again includes a storage means 26, such as a RAM, responsive to the received vehicle acceleration information for storing the current value a(t) and the last N−1 consecutive prior values therefor; and means 28, such as a pair of rank-order filters, responsive to the N acceleration values stored in the storage means 26 for generating the highest-ranked acceleration value $a_H$ among the stored values and the lowest-ranked acceleration value $a_L$ thereamong; a first calculating means 30 responsive to the thus-generated lowest-ranked acceleration value $a_L$ for generating its absolute value |$a_L$|; and a summing junction 32 for subtracting the thus-generated absolute value |$a_L$| of the lowest-ranked acceleration value $a_L$ from the highest-ranked acceleration value $a_H$. The desired modified variance value |Δa*(t)| is thereafter obtained by generating the absolute value Δa* of the difference between the highest-ranked value $a_H$ and the absolute value |$a_L$| of the lowest-ranked value $a_L$ in a second calculating means 34.

While the preferred embodiment of the invention has been disclosed, it should be appreciated that the invention is susceptible of modification without departing from the spirit of the invention or the scope of the subjoined claims. For example, while the invention is disclosed herein with respect to systems and methods for controlling actuation of a vehicle passenger safety device based on modified jerk or modified variance measures, the invention is applicable to any system and method for controlling actuation of the safety device in which received physical information or a function thereof is differentiated over time.

We claim:

1. In a system for controlling actuation of a passenger safety device in a vehicle to protect a passenger positioned in said vehicle against injury, said system being responsive to a first measure derived from information from the group consisting of vehicle acceleration information and vehicle passenger position information, said system including:

means for receiving said information;

means for storing said information to provide a plurality of stored values; and means responsive to a first and a second of said stored values for subtracting the first of said stored values from the second of said stored values to obtain said first measure, the improvement comprising:

first means responsive to the first of said stored values for generating a modified value, said modified value being the absolute value of the first of said values; and wherein said subtracting means is responsive to said modified value and the second of said stored values to subtract said modified value from the second of said stored values to obtain said first measure.

2. The system of claim 1, wherein the first of said stored values was received prior to the second of said stored values.

3. The system of claim 1, wherein the first and second of said stored values are the lowest-ranked and highest-ranked of said stored values, respectively.

4. In a method for controlling actuation of a passenger safety device in a vehicle to protect a passenger positioned in said vehicle against injury upon the occurrence of an event possibly requiring actuation of said safety device, said method including the steps of:

receiving information from the group consisting of vehicle acceleration information and vehicle passenger position information;

storing said received information over time to obtain a plurality of stored values;

subtracting a first of said stored values from a second of said stored values to obtain a first difference measure;

comparing said first difference measure to a first threshold value; and actuating said safety device when said first difference measure exceeds said first threshold value, the improvement comprising:

modifying the first of said stored values prior to said subtracting step by taking the absolute value thereof.

5. The method of claim 4, wherein the first of said stored values was received prior to the second of said stored values.

6. The method of claim 4, wherein the first and second of said stored values are the lowest-ranked and highest-ranked of said plurality of stored values, respectively.

7. The method of claim 6, wherein said step of receiving vehicle acceleration information comprises the step of sampling instantaneous vehicle acceleration information generated by an acceleration sensor; and wherein said highest-ranked stored value and said lowest-ranked stored value are generated by rank-order filtering said stored values.

8. The method of claim 6, including the further step of taking the absolute value of said first difference measure prior to said comparing step.

9. A method for generating a first measure useful in controlling actuation of a passenger safety device in a vehicle to protect a passenger positioned in said vehicle against injury upon the occurrence of an event possibly requiring actuation of said safety device, said method comprising the steps of:

receiving information from the group consisting of vehicle acceleration information and vehicle passenger position information;

storing said received information over time to obtain a plurality of stored values for said received information;

modifying a first of said stored values by taking the absolute value thereof to obtain a modified value; and subtracting said modified value from a second of said stored values to obtain said first measure.

10. The method of claim 9, wherein the first of said stored values was received prior to the second of said stored values.

11. The method of claim 9, wherein the first and second of said stored values are the lowest-ranked and highest-ranked of said plurality of stored values, respectively.

12. The method of claim 11, wherein said step of receiving vehicle acceleration information comprises the step of sampling instantaneous vehicle acceleration information generated by an acceleration sensor; and wherein said highest-ranked stored value and said lowest-ranked stored value are generated by rank-order filtering said stored values.

* * * * *